Dec. 2, 1969     T. C. CARNAVOS     3,481,835
MULTIPLE EFFECT DISTILLATION APPARATUS
Filed Oct. 5, 1967     3 Sheets-Sheet 1
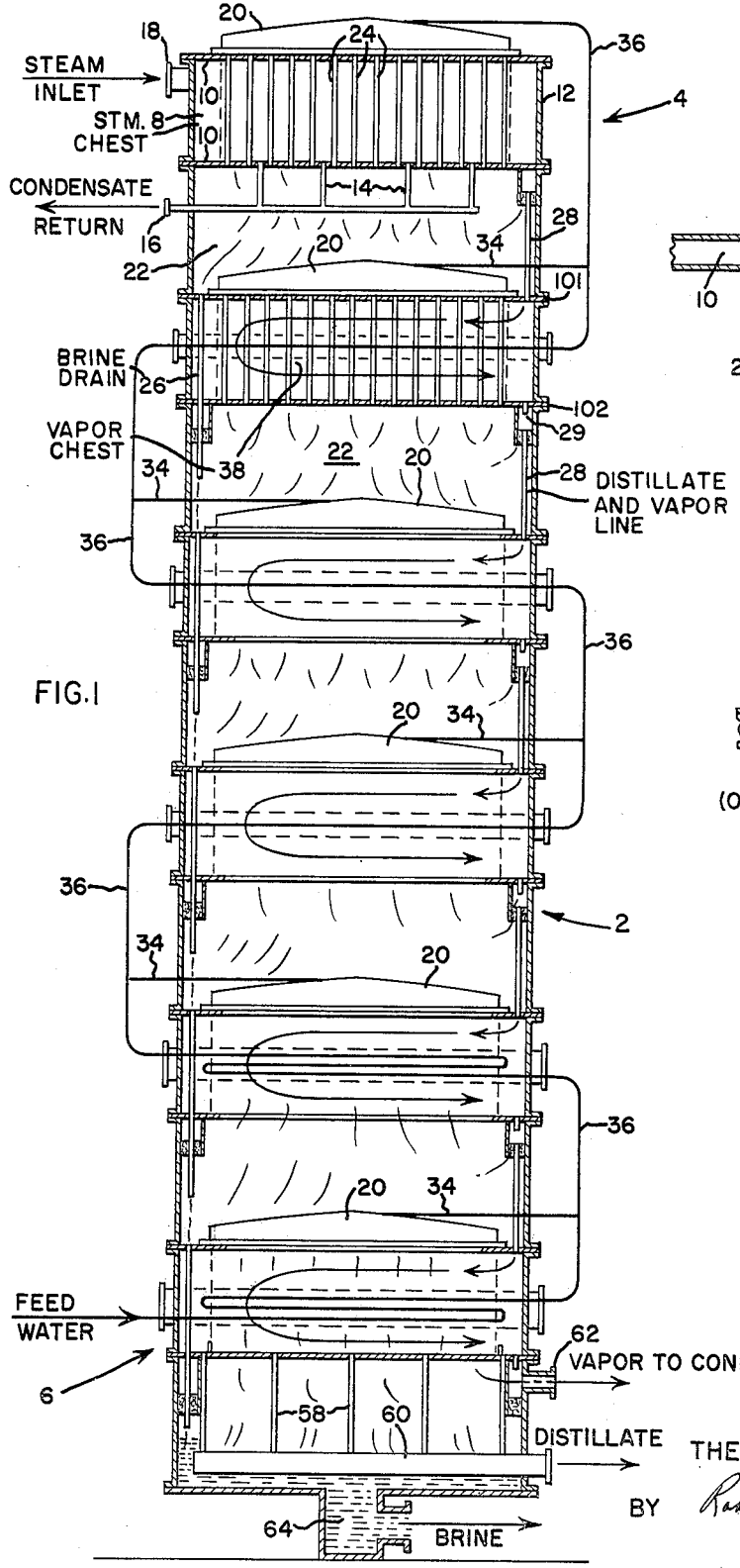
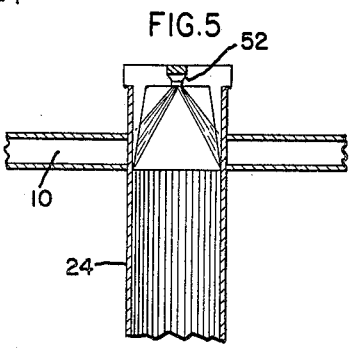
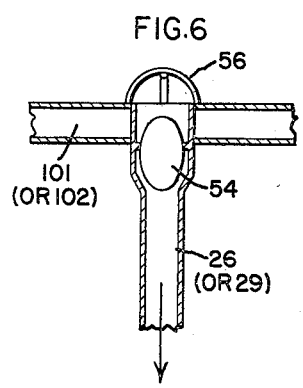
INVENTOR:
THEODORE C. CARNAVOS,
BY *Robert J. Bird*
HIS ATTORNEY.

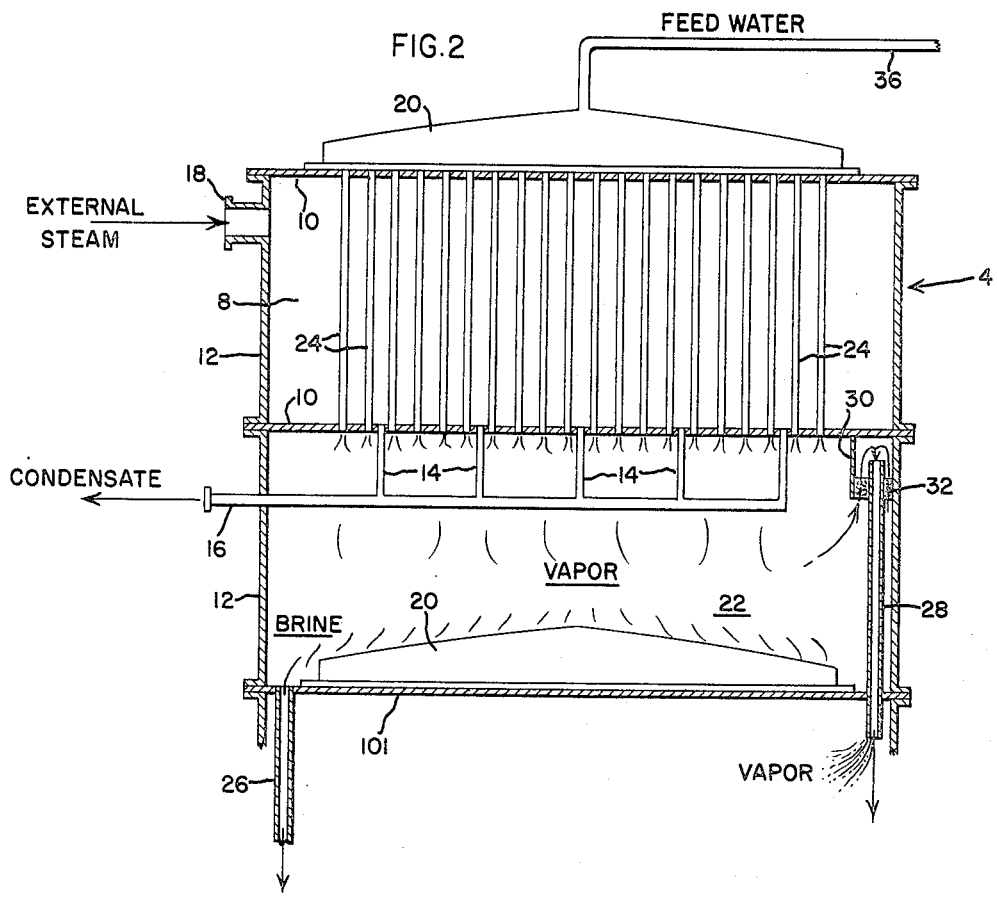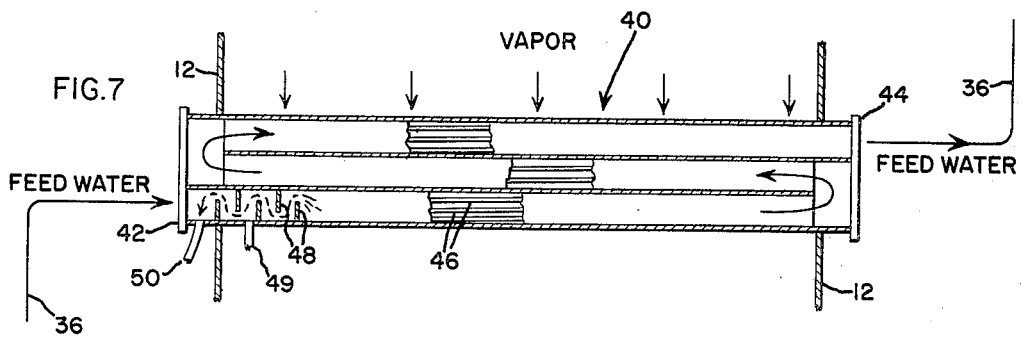

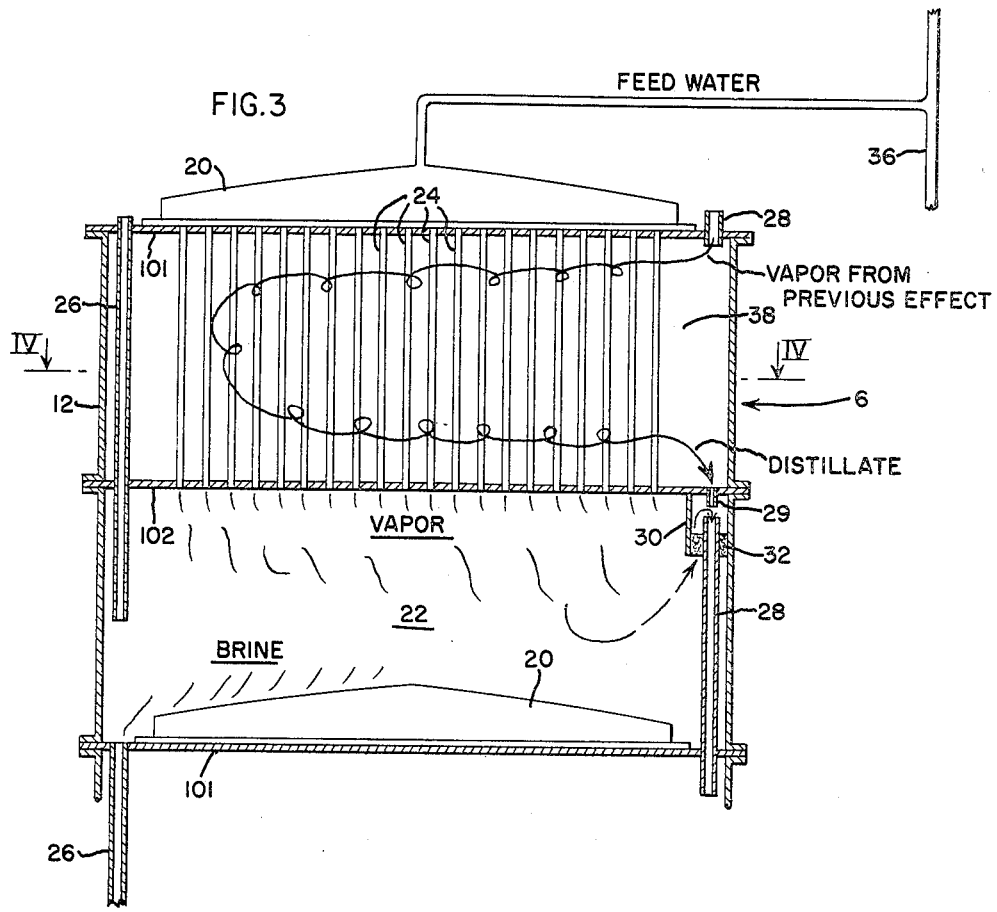
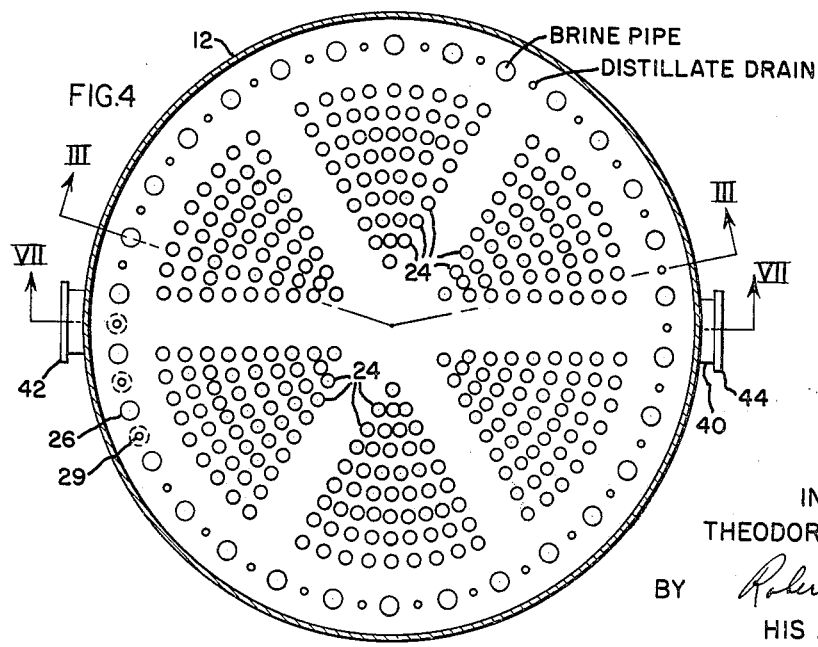

United States Patent Office 3,481,835
Patented Dec. 2, 1969

3,481,835
MULTIPLE EFFECT DISTILLATION APPARATUS
Theodore C. Carnavos, Cleveland, Ohio, assignor to General Electric Company, a corporation of New York
Filed Oct. 5, 1967, Ser. No. 673,035
Int. Cl. B01d 3/02, 1/26
U.S. Cl. 202—174               6 Claims

ABSTRACT OF THE DISCLOSURE

Multiple effect distillation apparatus having effects in a vertical series disposition. Flow of brine and distillate and pressure control in the several effects is aided by gravity.

BACKGROUND OF THE INVENTION

This invention relates generally to water distillation apparatus and more particularly to an improved multiple effect salt water distillation plant with a vertical disposition of its several effects.

One well known method of obtaining fresh water from salt or saline water is that of distillation. Distillation is the process of evaporating the saline water so that the vapor separates therefrom to be condensed in the form of salt-free or fresh water. Thus, the distillation process essentially involves adding the heat of vaporization to saline water and then taking away the same heat of vaporization from the resulting vapor to condense the same, separate from the saline water. The distillation process can be performed more economically if the heat of vaporization which is taken back or recovered from the vapors in the process of their condensation is reused to heat or evaporate additional saline water. This is the approach utilized in multiple effect distillation where the recovered heat of vaporization given up to the condensing surface of a heat transfer wall is used to vaporize saline water on the opposite surface of such a heat transfer wall.

It is possible to evaporate water on one side of a wall by condensing vapor on the opposite side thereof if the pressure and temperature on the evaporating side is sufficiently less than the pressure and temperature on the condensing side. For example, if the vapor on the condensing side of the wall is at a pressure of about 14″ of mercury absolute and about 176° F., it can be utilized to evaporate water at a pressure of about 13″ of mercury absolute on the other side of the wall since the saturation temperature at this pressure is about 173° F. The required temperature difference across the wall which will permit the necessary heat to be transferred through the wall depends on the heat transfer characteristics of the wall itself.

Ordinarily there is made available for distillation purposes steam at a particular temperature and pressure, and cooling water at a particular temperature which may be used as a heat sink. The temperatures of the steam and the cooling water therefore define the limits within which the multiple distillation effects must be performed. As a general rule, more water can be distilled if more effects can be achieved within given temperature limits.

Typical of the prior art are multiple effect distillation plants in which the several effects are horizontally disposed relative to one another. By comparison, the present invention includes a multiple effect distillation plant having a vertical arrangement of the several effects so that the flow therethrough is vertical and is aided by gravity.

Accordingly, it is one object of the present invention to provide a multiple effect distillation plant having a vertical arrangement so that gravity may be employed to aid in the fluid flow therethrough.

Another object is to provide a gravity flow distillation plant employing gravity for pressure control.

Another object is to provide a multiple effect distillation plant having a space-saving vertical arrangement of its several effects.

Other objects, advantages and features of the present invention will become apparent from the following description of one embodiment thereof when taken in connection with the accompanying drawing.

SUMMARY OF THE INVENTION

Briefly, the present invention includes a plurality of distillation effects, each comprising a feedwater header communicating through nozzles or other type distribution devices with the interior of vertically disposed double fluted tubes. The exterior of the double fluted tubes communicates with a source of heating vapor for the purpose of giving up its heat to the feedwater inside the tubes. The vapor outside the tubes condenses to form distillate and the water inside the tubes is evaporated and separates into brine and vapor. The vapor thus produced on the inside of the tubes is passed on to the next lower effect where it becomes the vapor on the outside of the tubes, condensing to form distillate and in turn giving up its heat to the feedwater on the inside of the tubes. Brine and distillate flow from each effect by the force of gravity to collection points at the base of the structure.

DRAWING

In the drawing, wherein like numbers designate like elements in the several figures:

FIG. 1 is an elevation view, partly in section, of a multiple effect distillation plant according to the present invention;

FIG. 2 is an elevation view of the first effect of the distillation plant in FIG. 1;

FIG. 3 is a sectional elevation view of a typical effect, subsequent to the first, of the distillation plant in FIG. 1; and taken along the lines III—III of FIG. 4;

FIG. 4 is a plan view taken along the lines IV—IV of FIG. 3;

FIG. 5 is a detail of a single nozzle and double fluted tube used in the present distillation plant;

FIG. 6 is a detail of self-controlled distillate drain used in the present distillation plant; and FIG. 7 is a sectional view taken along the lines VII—VII of FIG. 4.

DESCRIPTION

Referring now to FIG. 1, a multiple effect vertically arranged distillation plant according to the present invention is generally indicated at 2. Distillation plant 2 includes a first effect, generally indicated at 4, and subsequent effects, generally indicated at 6, the distillation plant shown having five such subsequent effects vertically stacked below the first.

Referring now to FIG. 2, a more detailed description of the first effect will be given. The first distillation effect 4 includes a steam chest 8 which is defined by bottom and top tube sheets 10 and a vertical wall 12 extending between tube sheets 10. A plurality of condensate drains 14 extend through the lower tube sheet 10 connecting steam chest 8 with condensate return line 16. A source of external steam communicates with steam chest 8 at a connection point 18. External to first effect 4, is a source of steam, not shown, which is part of a closed circuit and is in series between condensate return line 16 and steam connection 18.

A feedwater supply header of reservoir 20 is disposed above steam chest 8. A plurality of double fluted heat exchange tubes 24 extend through the upper tube sheet 10 to communicate with the feedwater header 20 and through lower tube sheet 10. Between the lower tube sheet 10 of the first effect 4 and the next lower tube sheet 101, (which is the upper tube sheet of the next subsequent effect 6) and defined by vertical wall 12, is a separation chamber 22. Thus, tubes 24 communicate with header 20 and separation chamber 22. These double fluted heat exchange tubes 24 are fully disclosed in U.S. Patent 3,291,704 issued to Gunther E. Diedrich and Charles W. Lotz, and U.S. Patent 3,244,601 issued to Gunther E. Diedrich, and need not be further described herein.

A plurality of vertically extending brine drain lines 26 extend through tube sheet 101. Similarly, a plurality of vertically extending vapor and distillate transmission lines 28 extend vertically through tube sheet 101. This is also shown in FIG. 4. Vapor and distillate transmission lines 28 are supported by a suitable support shown at 30 so as to communicate with the uppermost portion of separation chamber 22 through a mesh or moisture removing element 32.

Referring now to FIG. 3, a typical distillation effect 6 subsequent to the first is shown. Since this effect is substantially the same as the first effect above described, only the differences will be described here. Corresponding to steam chest 8 in the first effect, a vapor chest 38 appears in the subsequent effects and forms the shell side of the heat exchanger around double fluted tubes 24. Vapor chest 38 performs the same function as steam chest 8, the difference being in the nomenclature.

Steam and condensate as used herein are meant to designate the fluids in the external closed loop of steam and condensate in the first effect which does not become a part of the distillate or product of the distillation plant. Vapor and distillate designate the corresponding fluids in the subsequent effects, these fluids becoming the product water. The upper and lower tube sheets defining vapor chest 38 are designated 101 and 102 respectively. They differ from tube sheets 10 in the first effect in that sheets 101 are passed through by brine drain lines 26 and by vapor and distillate transmission lines 28. Sheets 102 are passed through by distillate drain lines 29, which drain into lines 28.

Referring now to FIG. 7, there is shown a vertical cross section along the lines VII—VII of FIG. 4. It will be seen from FIGS. 4 and 3 that the structure in FIG. 7 is horizontally disposed approximately in the middle of each vapor chest 38, extending diametrically thereacross. FIG. 7 shows a heat exchanger generally indicated at 40 for the purpose of preheating feedwater entering at 42 and exiting at 44 after a triple pass. The feedwater entering at 42 flows through heat exchanger tubes 46 which are disposed in the path of vapor within each vapor chest 38. Feedwater flows to and from heat exchangers 40 through feedwater line 36 and feedwater inlet branch lines 34. A series of baffle plates 48 is positioned near the inlet end of the first heat exchange pass on the shell side of each heat exchanger 40. This provides a tortuous path which sub-cools any non-condensibles which then are removed from the system via a suitable vent line 50. The vapor condensed during this process drains via line 49 into and combines with other distillate in chest 38.

Referring now to FIG. 5, a detail view is shown of one double fluted heat exchanger tube 24 at its upper or nozzle portion. Tube 24 communicates with the interior of feedwater header 20 by means of a spray nozzle 52 which sprays feedwater in a conical configuration against the inside wall of tube 24 so that the feedwater flows downward therealong. The use of a spray nozzle to distribute the feedwater is presently preferred, but the invention is not limited by any particular nozzle.

Referring to FIG. 6, a detail view is shown of brine drain line 26 where it passes through tube sheet 101. The tube is expanded at its end where it fits into the tube sheet. A self-controlled float valve member 54 is disposed within the expanded end such that it is movable to block the flow passage through the tube or to permit flow therethrough. A retainer cage 56 is fixed above the mouth of each tube to prevent the escape of float member 54. Distillate drain lines 29 include similar float valves with floats 54 and retainers 56.

Referring again to FIG. 1, the last or lowermost distillation effect differs slightly structurally from the rest in that the vapor chest 38 communicates through its lower tube sheet 102 with a plurality of distillate drain pipes 58 which connect in common to a distillate drain manifold 60 which leads to a distillate collection tank, not shown. The separation chamber 22 of the last effect 6 communicates through piping connection 62 to an external condenser, not shown. The lowermost brine drain lines 26 empty into a brine sump 64 which communicates with a brine pump, not shown, to discard the brine.

OPERATION

In operation, saline or feedwater is pumped into the lowermost heat exchanger 40 and through a series of feedwater lines 36 and heat exchangers 40 to the topmost feedwater supply header 20, filling all the headers 20 in the process. From headers 20, feedwater is continually sprayed through nozzles 52 into the interior of double fluted tubes 24 and gravitates downward along the interior walls thereof.

Meanwhile, in the first effect 4, steam is introduced into steam chest 8 whereupon it gives up its heat to the tubes 24, condensing thereon. Condensate from this steam collects in condensate return line 16 and is returned continuously to a steam generator in this closed external steam loop.

On the inside of tubes 24, the feedwater is vaporized by the heat given up by the external steam. Accordingly, a mixture of vapor at a pressure $P_1$ and brine emerges from the lower ends of tubes 24 into separation chamber 22. Separation chamber 22 is so designated because it is here that brine and vapor separate. The brine gravitates into brine drainline 26 and vapor flows through mesh 32 and into vapor transmission lines 28.

In the next lower effect 6, simultaneously, vapor is entering vapor chest 38 through the several vapor transmission lines 28 coming from the first effect separation chamber 22. This vapor gives up its heat to the double fluted tube 24, similarly as in the first effect, and condenses thereon to form distillate. This distillate drains continuously through drain lines 29 and into transmission lines 28 which together convey it to the bottom drain manifold 60. The heat thus being given up by the vapor as it condenses to form distillate is absorbed by the feedwater which is being continually sprayed against the inside walls of tubes 24, creating more vapor at a lower pressure $P_2$ which in turn separates from its brine in the next lower separation chamber 22.

In the final distillation effect, vapor similarly enters vapor chest 38 through transmission lines 28 from the previous effect. Again, this vapor gives up its heat to the feedwater inside tubes 24 vaporizing the same at the lowest pressure $P_6$ and condensing itself. The resulting condensate drains from the bottom of this last vapor chest through distillate drain pipes 58 into distillate drain manifold 60 from which it is pumped or led to a storage means. The vapor generated in this last effect communicates directly through piping connection 62 to an external steam condenser where it is condensed at a low vacuum pressure, to form distillate. It will be appreciated that in tubes 28 after the first effect, the fluid passing therethrough is a mixture of distillate and vapor, the distillate continuing to fall through the tubes until reaching the distillate drain manifold 60. Similarly, the brine drains through lines 26 and continues to drain through such lines starting with the second effect down to the last until it reaches the brine sump 64.

The vacuum pressure in the last named condenser and the vapor pressure of the feedwater in the first effect double fluted tubes establish the pressure differential or motivating pressure for this multiple effect distillation plant. To insure that the pressure differential that exists between successive effects is maintained, the float valve 54 existing in each brine drainline 26 and each distillate drain line 29 operates to allow communication through the valve only when there is a positive level of brine or distillate above the valve port. When there is no such water level, the float valve has closed so that the pressure difference across it is maintained and no vapor blow through is permitted which would adversely affect the performance of the apparatus. The float member is of such a shape that it will float up and away from its closed or sealing position when there is a liquid reservoir above it. As one example, an egg-shaped float has been found to perform satisfactorily for this purpose. The pressure differential so maintained is of course essential to the multiple effect arrangement since the successively lower effect pressures enable the vapor from one effect to be the heat supply for the next lower effect.

As feedwater is pumped through line 36, it enters the tubes of heat exchanger 40 where it becomes preheated to some degree before continuing again into the next series feedwater line 36. From feedwater line 36, at each effect, water passes through feedwater inlet branch line 34 to each individual supply header 20. In each line 34 there is a pressure reducing valve or orifice for the purpose of reducing the pressure in header 20 so that there is a proper flow rate in each effect through the double fluted tubes 24. One purpose of the heat exchangers 40 is to preheat feedwater to a degree that it approaches the boiling point corresponding to the pressure in each particular effect used.

Another feature of the heat exchangers 40 is as follows. With the coolest water entering at inlet 42 of each of these heat exchangers 40, there is condensation of the shell side vapor taking place at that area. The resulting slightly lower pressure on the shell side near the entrance or inlet 42 motivates vapors in that direction. Baffle plates 48 create a tortuous path for such vapors on their way towards vent line 50 which is communicating with a lower pressure, in the next lower effect or elsewhere in the system. This tortuous path provides a means of removal of air and other noncondensibles which may have found their way into the vapor.

By means of the arrangement above described, it will be appreciated that the flow of water, distillate, and brine, through the several effects is aided by gravity and likewise, pressure control throughout the system is aided by the gravity operated float valve 54. The vertical arrangement of the multiple effect distillation plant of this invention also provides economies in space as compared to prior art distillation plants having multiple effects arranged horizontally over a larger area.

It may occur to others of ordinary skill in the art to make modifications of this invention which will remain within the concept and scope thereof and will not constitute a departure therefrom. Accordingly, it is intended that the invention be not limited by the details in which it has been described but that it encompass all within the purview of the following claims.

What is claimed is:
1. A multiple effect distillation plant including:
   a first distillation effect,
   a plurality of subsequent distillation effects,
   said effects disposed one above another with said first effect being uppermost,
   each of said effects comprising:
      a feedwater header,
      a feedwater inlet branch line,
      a feed heating vapor chest,
      a vapor-concentrate separation chamber, and
      a plurality of double fluted heat exchange tubes extending substantially vertically through said vapor chest and communicating with said header and with said separation chamber,
      a raw feed line passing serially thru said vapor chests from the last to the first and connecting to each feed water inlet branch line,
   the vapor chest of each subsequent effect communicating through distillate drain lines with the separation chamber of the same effect,
   the separation chamber of each effect communicating through vapor transmission lines with the vapor chest of the next lower effect and through brine drain lines with the separation chamber of the next lower effect,
   said first effect vapor chest communicating with a source of steam and a condensate return in a closed steam-water circuit, and the separation chamber of the last of said effects communicating with a vapor condenser.

2. A multiple effect distillation plant according to claim 1 said subsequent effects further including:
   a heat exchanger horizontally disposed in each of said vapor chests and contained in said raw feed line to preheat feedwater passing therethrough toward said feedwater headers.

3. A multiple effect distillation plant according to claim 1 further including
   liquid-level responsive means to seal or open said brine drain lines and said distillate drain lines with fall and rise of said liquid level respectively.

4. A distillation plant according to claim 3 in which said liquid level responsive means is a float valve located in the inlets of said drain lines.

5. A distillation plant according to claim 1 wherein said double-fluted heat exchange tubes include a spray nozzle at their upper ends.

6. A distillation plant according to claim 1 wherein the fluid flow from said feedwater headers downward through said plant is motivated in part by gravity.

References Cited

UNITED STATES PATENTS

| | | | |
|---|---|---|---|
| 378,843 | 2/1888 | Lillie | 159—17 |
| 1,524,184 | 1/1925 | Lawrence | 159—18 |
| 2,413,292 | 12/1946 | Christensen | 159—18 X |
| 3,249,517 | 5/1966 | Lockman | 159—18 X |
| 3,303,106 | 2/1967 | Standiford | 159—18 X |
| 3,304,242 | 2/1967 | Cockman | 159—18 X |

FOREIGN PATENTS

| | | |
|---|---|---|
| 15,698 | 8/1891 | Great Britain. |

NORMAN YUDKOFF, Primary Examiner

J. SOFER, Assistant Examiner

U.S. Cl. X.R.

159—18, 2